(12) United States Patent
Yamanaka et al.

(10) Patent No.: US 9,885,813 B2
(45) Date of Patent: Feb. 6, 2018

(54) PROJECTION APPARATUS

(71) Applicant: Panasonic Intellectual Property Management Co., Ltd., Osaka (JP)

(72) Inventors: Kazuhiko Yamanaka, Toyama (JP); Kiyoshi Morimoto, Osaka (JP); Seigo Shiraishi, Osaka (JP); Yoshihisa Nagasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 50 days.

(21) Appl. No.: 14/975,667

(22) Filed: Dec. 18, 2015

(65) Prior Publication Data

US 2016/0109627 A1    Apr. 21, 2016

Related U.S. Application Data

(63) Continuation of application No. PCT/JP2014/002077, filed on Apr. 11, 2014.

(30) Foreign Application Priority Data

Jul. 4, 2013    (JP) .................................. 2013-140454

(51) Int. Cl.
*G02B 5/26* (2006.01)
*G02B 5/20* (2006.01)
(Continued)

(52) U.S. Cl.
CPC ............ *G02B 5/26* (2013.01); *F21S 48/1145* (2013.01); *F21S 48/1225* (2013.01);
(Continued)

(58) Field of Classification Search
CPC ........ G02B 5/26; G02B 5/208; G02B 27/106; F21S 48/1145; F21S 48/1225;
(Continued)

(56) References Cited

U.S. PATENT DOCUMENTS

2006/0262514 A1*  11/2006  Conner ................ G02B 27/283
                                                          362/19
2010/0277939 A1*  11/2010  Komatsu .............. F21S 48/1159
                                                          362/516
2012/0051027 A1*  3/2012  Takahashi ............ F21S 48/1145
                                                          362/84

FOREIGN PATENT DOCUMENTS

JP    2010-262767    11/2010
JP    2010-262768    11/2010
JP    2012-053995    3/2012

OTHER PUBLICATIONS

International Search Report of PCT application No. PCT/JP2014/002077 dated Jul. 8, 2014.

* cited by examiner

*Primary Examiner* — Mary Ellen Bowman
(74) *Attorney, Agent, or Firm* — McDermott Will & Emery LLP

(57) ABSTRACT

A projection apparatus of the present disclosure includes a light-emitting element for emitting excitation light, a wavelength converter for receiving the excitation light, converting the excitation light into light of a different wavelength, and emitting the converted light as radiation light, and an optical filter for receiving the radiation light. The optical filter reflects long-wavelength light of wavelengths longer than wavelengths of the radiation light. With this configuration, the optical filter reflects long-wavelength light of wavelengths longer than wavelengths of the radiation light, thus being able to prevent the wavelength converter from being irradiated with long-wavelength light, and being able to prevent deterioration of the wavelength converter.

10 Claims, 17 Drawing Sheets

(51) Int. Cl.
*F21S 8/10* (2006.01)
*G03B 21/20* (2006.01)
*G02B 27/10* (2006.01)

(52) U.S. Cl.
CPC ....... *F21S 48/1241* (2013.01); *F21S 48/1394* (2013.01); *G02B 5/208* (2013.01); *G03B 21/204* (2013.01); *G03B 21/208* (2013.01); *G03B 21/2013* (2013.01); *G02B 27/106* (2013.01)

(58) Field of Classification Search
CPC .............. F21S 48/1241; F21S 48/1394; G03B 21/2013; G03B 21/204; G03B 21/208
See application file for complete search history.

FIG. 8

|  | Without filter 40 | With filter 40 |
|---|---|---|
| Luminous flux | 100 lm | 93 lm |
| Color temperature | 4970K | 4960K |
| Average color rendering index | 65 | 65 |

PROJECTION APPARATUS

BACKGROUND OF THE INVENTION

1. Field of the Invention

The present disclosure relates to projection apparatuses used in illumination fields such as lighting for vehicles that use light generated by irradiating a wavelength conversion element with light emitted from a light source.

2. Description of the Related Art

As shown in FIG. 16, a conventional projection structure of this type has reflecting member 1041 and light-emitting member 1042. Reflecting member 1041 has a reflecting surface 1041a formed in a deep concave shape with a focus located in a vicinity of a vertex. Light-emitting member 1042 is disposed at and around the focus of reflecting surface 1041a, and emits light by being excited by excitation light.

Light-emitting member 1042 is a powder of a fluorescent material that absorbs excitation light L1 from laser 1043 and generates fluorescence, mixed into resin or the like and solidified, or particles of a fluorescent material mixed into a binder and applied.

As citation information on this application, for example, PTL 1 is known.

CITATION LIST

Patent Literature

PTL 1: Unexamined Japanese Patent Publication No. 2012-53995

Using a conventional projection apparatus like this for outdoor illumination such as lighting for a vehicle has a problem that sunlight enters from the outside of the projection apparatus, and infrared rays are concentrated onto a light-emitting member, thus deteriorating the light-emitting member.

SUMMARY OF THE INVENTION

In order to solve the above problem, a projection apparatus of the present disclosure includes a light-emitting element for emitting excitation light, a wavelength converter for receiving the excitation light, converting the excitation light into light of a different wavelength, and emitting the converted light as radiation light, and an optical filter for receiving the radiation light. The optical filter reflects long-wavelength light of wavelengths longer than wavelengths of the radiation light.

With this configuration, the optical filter reflects long-wavelength light of wavelengths longer than wavelengths of radiation light, thus being able to prevent the wavelength converter from being irradiated with long-wavelength light, and being able to prevent deterioration of the wavelength converter.

BRIEF DESCRIPTION OF DRAWINGS

FIG. 8 is a diagram illustrating an effect of the projection apparatus in the first exemplary embodiment of the present disclosure;

DETAILED DESCRIPTION OF THE PREFERRED EMBODIMENTS

First Exemplary Embodiment

Projection apparatus 1 in a first exemplary embodiment of the present disclosure will be described with reference to FIGS. 1 to 8.

Figure 1:
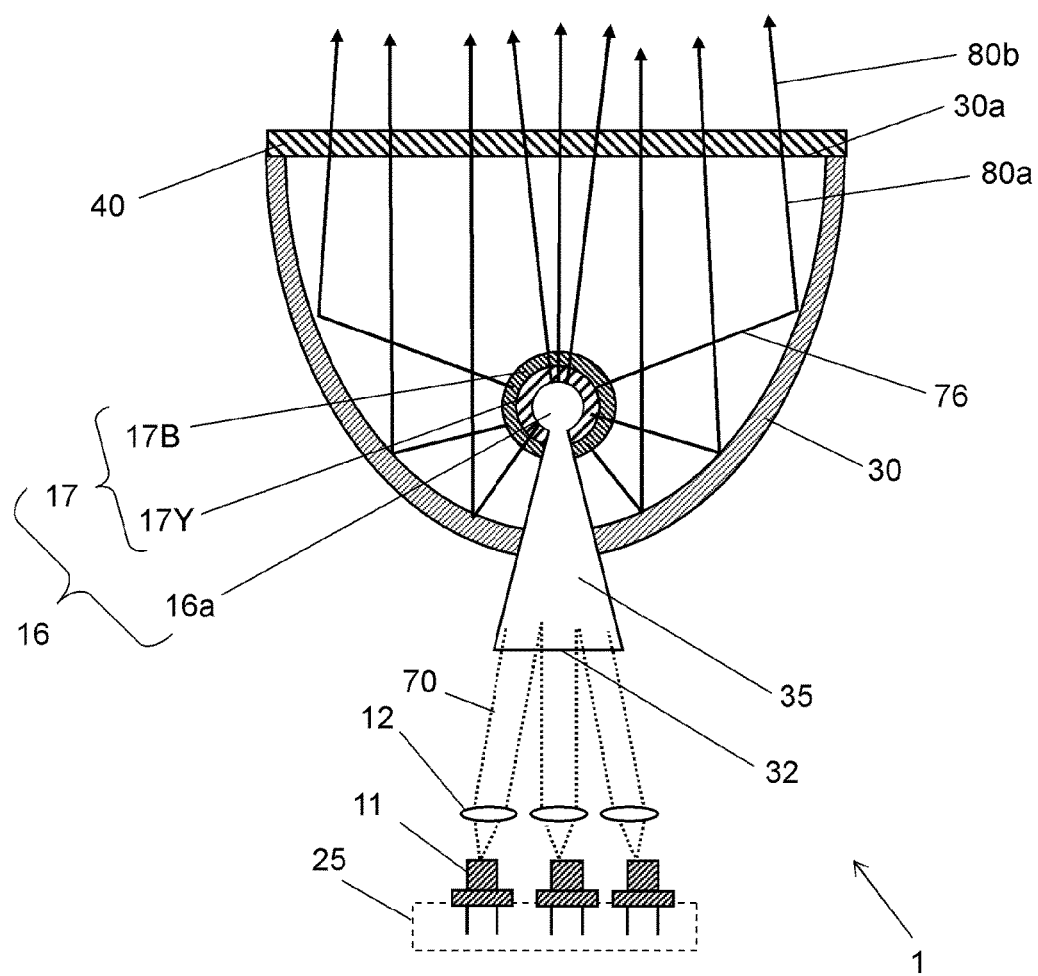
FIG. 1 is a schematic diagram of a projection apparatus in a first exemplary embodiment of the present disclosure.

A schematic diagram of a projection apparatus in the first exemplary embodiment of the present disclosure is shown in FIG. 1. As shown in FIG. 1, projection apparatus 1 in this exemplary embodiment includes light-emitting elements 11, wavelength converter 16, and optical filter 40. Light-emitting elements 11 emit excitation light. Wavelength converter 16 receives the excitation light, converts the excitation light into light of a different wavelength, and emits the light as wavelength-converted light 76. Wavelength-converted light 76 is radiation light. Optical filter 40 receives wavelength-converted light 76. Optical filter 40 reflects long-wavelength light of wavelengths longer than wavelengths of the radiation light.

With this configuration, optical filter 40 reflects long-wavelength light of wavelengths longer than wavelengths of the radiation light, thus being able to prevent wavelength converter 16 from being irradiated with long-wavelength light, and being able to prevent deterioration of wavelength converter 16.

Hereinafter, a more specific configuration including an optional configuration will be described.

Light-emitting elements 11 are formed by semiconductor light-emitting elements, for example, nitride semiconductor lasers with an emission center wavelength of about 405 nm and an optical output of 2 watts. In this exemplary embodiment, three light-emitting elements 11 are disposed on heatsink 25. Light emitted from light-emitting elements 11 is converted into emission light 70 of straight light by collimating lenses 12. Light-guiding member 35 guides emission light 70 to wavelength converter 16. Reflector 30 reflects wavelength-converted light 76 emitted from wavelength converter 16 in a forward direction as emission light 80b. Reflector 30 has a film of metal such as Al or Ag or an Al film with a protective film formed on a surface, for example. Reflector 30 has a concave shape, and wavelength converter 16 is disposed inside the concave shape. Optical filter 40 is provided to cover opening 30a of reflector 30.

Light-guiding member 35 is a member integrally formed with support 16a of wavelength converter 16, and is made of a material that does not absorb light of wavelengths of 400 nm and more, such as low-melting-point glass, for example. Light-guiding member 35 has a conical shape with a diameter decreasing toward support 16a, and can be integrally formed with support 16a by softening a distal end portion in a high-temperature furnace and forming the distal end portion in a spherical shape, for example. Phosphor layer 17 is formed on support 16a to cover support 16a. Specifically, fourth phosphor layer 17Y containing a phosphor that emits yellow light such as an Eu-activated (Ba, Sr)$Si_2O_2N_2$ phosphor or a Ce-activated $Y_3Al_5O_{12}$ phosphor, for example, and third phosphor layer 17B containing a phosphor that emits blue light such as an Eu-activated $Sr_3MgSi_2O_8$ phosphor or an Eu-activated $BaMgAl_{10}O_{17}$ phosphor, for example, are formed in order to cover support 16a. For fourth phosphor layer 17Y and third phosphor layer 17B, the above-described phosphors are mixed into a transparent material such as silicone and fixed to support 16a by a mold or the like, for example.

Figure 2:
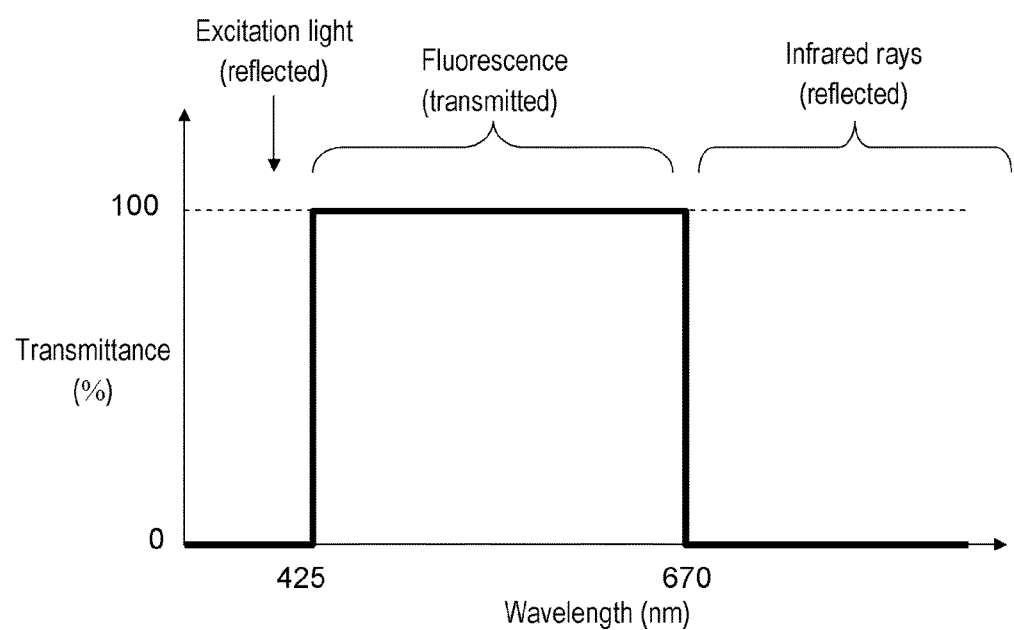
FIG. 2 is a graph showing a preferable transmission spectrum of an optical filter used in the projection apparatus in the first exemplary embodiment of the present disclosure.
Figure 3:
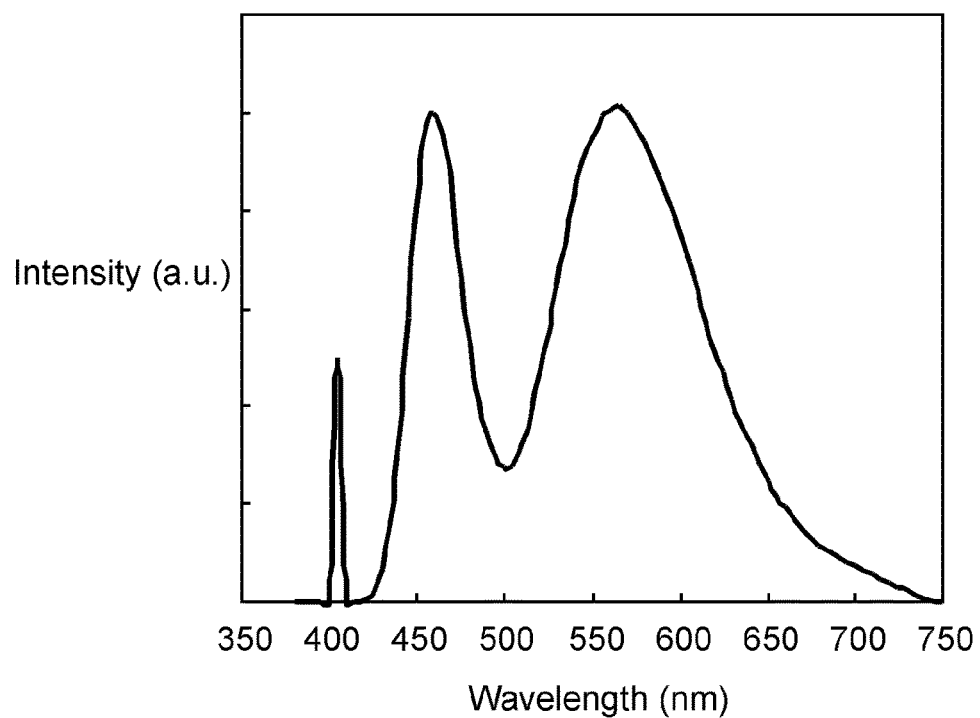
FIG. 3 is a graph showing a spectrum of wavelength-converted light used in the projection apparatus in the first exemplary embodiment of the present disclosure.
Figure 4:
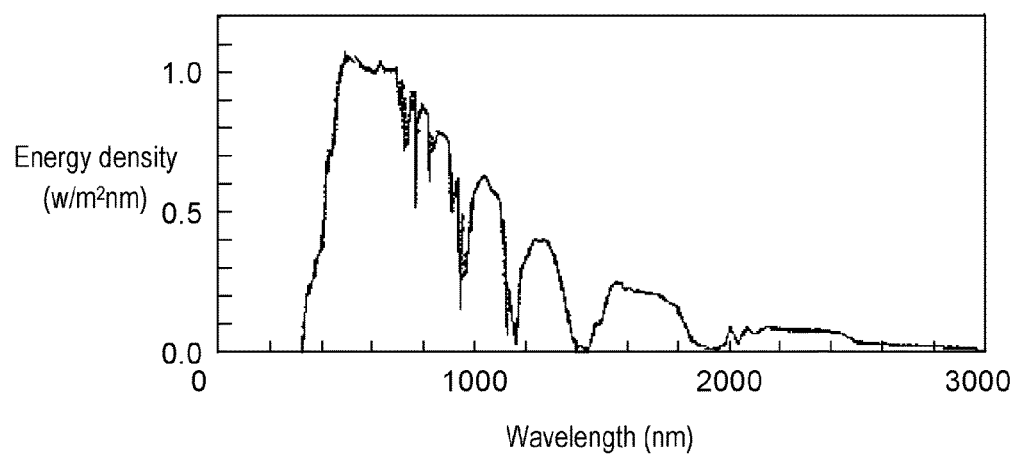
FIG. 4 is a graph showing a spectrum of sunlight incident on the projection apparatus in the first exemplary embodiment of the present disclosure.

As shown in FIG. 2, optical filter 40 preferably has characteristics of reflecting light of wavelengths of 420 nm or less and light of wavelengths of 700 nm or more, for example.

Next, an operation of projection apparatus 1 will be described. Emission light of 6 watts, for example, emitted form three light-emitting elements 11 is converted into emission light 70 of straight light by collimating lenses 12, and enters from entering end 32 of light-guiding member 35 into light-guiding member 35. The light that has entered light-guiding member 35 is either directly guided to support 16a or guided to support 16a while being totally reflected off a surface of light-guiding member 35. Emission light 70 that has entered support 16a is partly absorbed by fourth phosphor layer 17Y. Light that has passed through fourth phosphor layer 17Y enters third phosphor layer 17B. Light that has entered fourth phosphor layer 17Y and third phosphor layer 17B is converted into yellow light and blue light, and emitted as wavelength-converted light 76 of white light from wavelength converter 16 in all directions. Wavelength-converted light 76 emitted from wavelength converter 16 directly travels toward optical filter 40 or becomes reflected light 80a reflected off a reflecting surface of reflector 30, radiating in an upward direction in FIG. 1. At this time, a spectrum of wavelength-converted light 76 and reflected light 80a constitutes laser light of a wavelength of about 405 nm and fluorescence having peaks at a wavelength of about 460 nm and at a wavelength of about 570 nm which are the origins of phosphors, and white light are comprised of the laser light and the fluorescence shown in FIG. 3. On the other hand, when a projection apparatus like this is installed outdoors, it is necessary to consider an effect of sunlight from the sun. Sunlight has a spectrum shown in FIG. 4, and becomes a heat-generation factor since infrared rays of wavelengths of 700 nm or more, in particular, are easily absorbed into materials. In particular, in a projection apparatus using reflector 30, sunlight incident from the projection apparatus is easily concentrated onto wavelength converter 16 by reflector 30.

Figure 5:
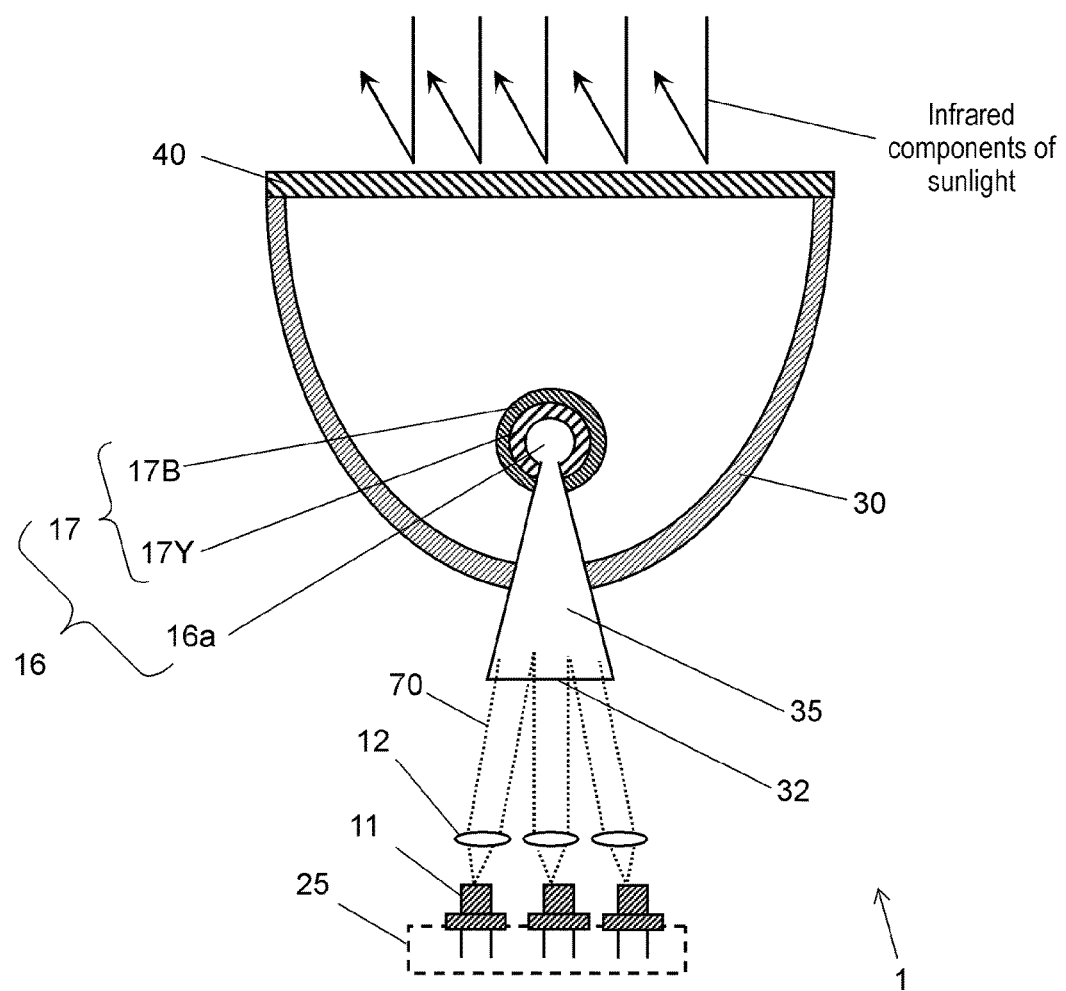
FIG. 5 is a schematic diagram illustrating an operation of the projection apparatus in the first exemplary embodiment of the present disclosure.

Therefore, optical filter 40 having transmittance characteristics as shown in FIG. 2 is provided at opening 30a of reflector 30. First, when radiation light emitted from wavelength converter 16 passes through optical filter 40, light of wavelengths of 420 nm or less, for example, is removed, so that emission light 70 from light-emitting elements 11 is not directly emitted to the outside of projection apparatus 1. Further, infrared rays of sunlight incident from outside are reflected by optical filter 40 as shown in FIG. 5 and thus can be prevented from being concentrated onto wavelength converter 16, and wavelength converter 16 can be prevented from generating heat.

Figure 6:
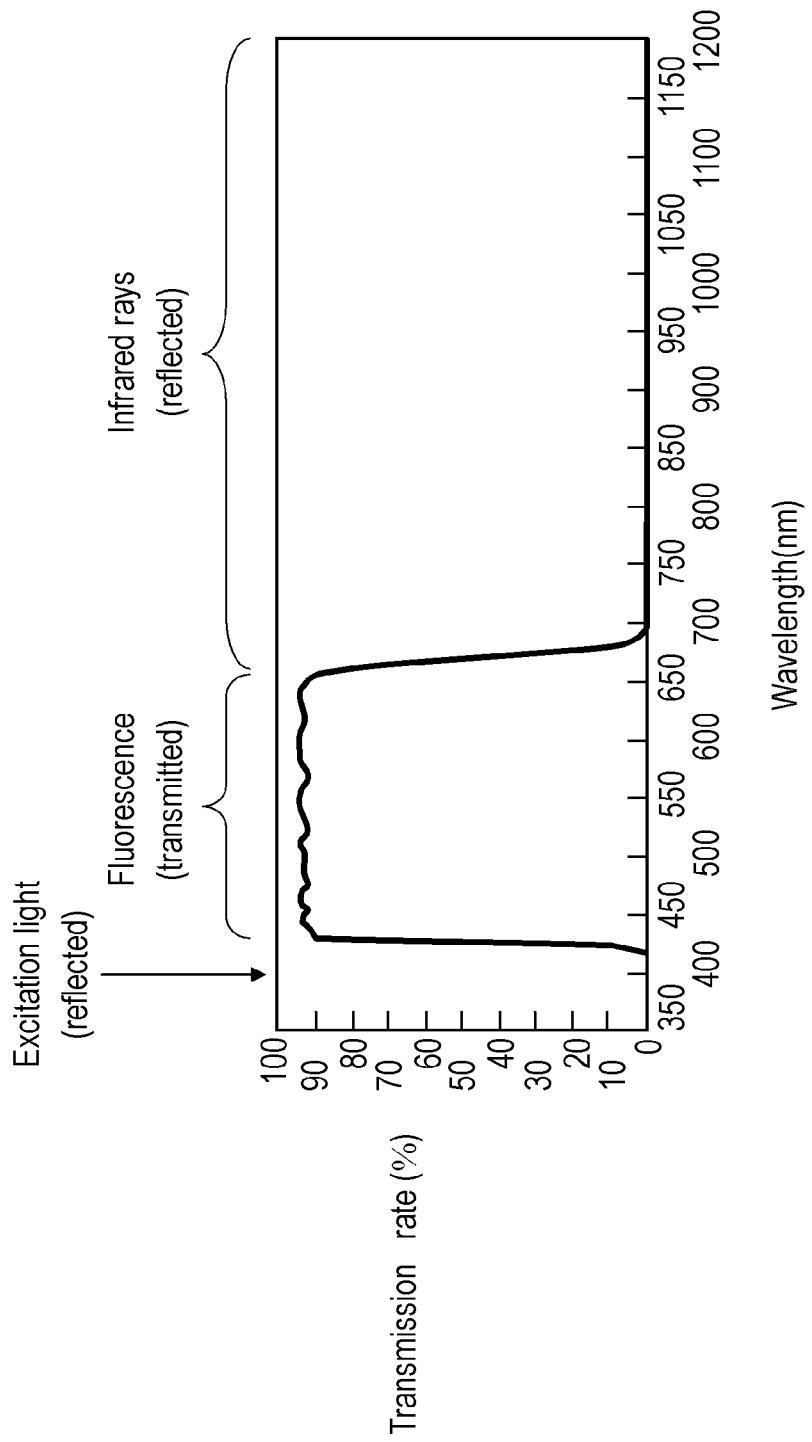
FIG. 6 is a graph showing a transmission spectrum of a specific example of optical filter 40 used in the projection apparatus.

A specific example of optical filter 40 will be described below. FIG. 2 shows an ideal transmission spectrum of optical filter 40. Optical filter 40 is formed by a multi-layer film of dielectrics such as $MgF_2$, $SiO_2$, $Ta_2O_3$, $Al_2O_3$, and $TiO_2$, for example. As shown in FIG. 6 illustrating a transmission spectrum of optical filter 40, optical filter 40 in this exemplary embodiment reflects light of wavelengths of 420 nm or less and light of wavelengths of 700 nm or more, and transmits light of wavelengths of between 430 nm and 660 nm inclusive.

Figure 7:
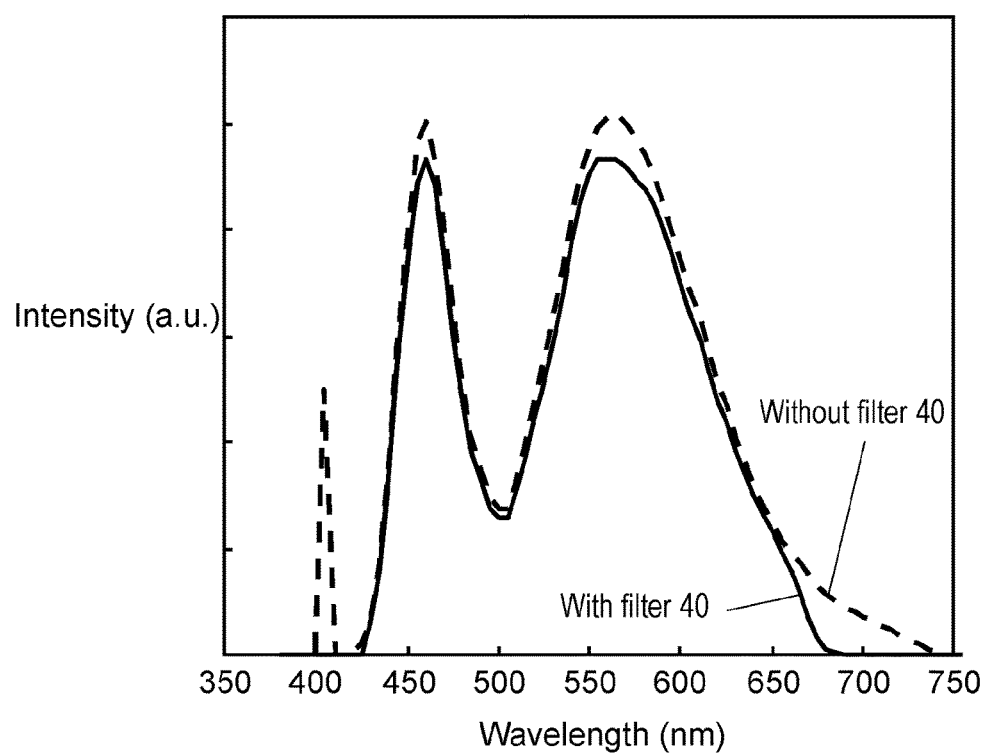
FIG. 7 is a diagram illustrating an effect of the projection apparatus in the first exemplary embodiment of the present disclosure.

When a spectrum of emission light emitted from projection apparatus 1 using optical filter 40 that has the transmission spectrum characteristics shown in FIG. 6 was measured under sunlight, spectrum characteristics shown by a solid line in FIG. 7 were obtained. The spectrum characteristics shown by the solid line in FIG. 7 is similar to spectrum characteristics shown by a solid line in FIG. 3. As for the spectrum characteristics shown by the solid line in FIG. 7, an effect of reflection of sunlight in optical filter 40 is removed. On the other hand, a dotted line in FIG. 7 shows spectrum characteristics when optical filter 40 is not provided. The spectrum characteristics shown by the dotted line in FIG. 7 are the same as the spectrum characteristics shown by the solid line in FIG. 3. From results in FIG. 7, it has been found that, in particular, light intensity of light having wavelengths of 680 nm or more is nearly zero (there is no foot at wavelengths of 680 nm or more). That is, it has been found that about infrared portions of sunlight, sunlight does not enter into projection apparatus 1, and does not exit from projection apparatus 1. Further, radiation of laser light having a wavelength of about 405 nm, which was found when optical filter 40 was not provided, was also nearly zero. Referring to FIG. 8, emission light emitted from projection apparatus 1 when optical filter 40 described above was provided and emission light emitted from projection apparatus 1 when optical filter 40 was not provided will be comparatively explained. As shown in FIG. 8, on color temperatures and average color rendering indices, there were almost no differences between a case of providing optical filter 40 and a case of not providing optical filter 40. On luminous fluxes, a luminous flux nearly equal to a luminous flux when a common transparent glass was disposed could be obtained. Specifically, while a luminous flux when optical filter 40 was not provided was 100 lm, a luminous flux when optical filter 40 was provided was 93 lm. As is clear from these explanations, using projection apparatus 1 of the present disclosure allows infrared rays from sunlight to be effectively reflected without much changing emission light from light-emitting elements 11.

Although optical filter 40 according to the above-described first exemplary embodiment has characteristics of reflecting light of wavelengths of 420 nm or less and light of wavelengths of 700 nm or more, an optical filter absorbing light of wavelengths of 420 nm or less and light of wavelengths of 700 nm or more, and transmitting light of wavelengths of between 430 nm and 660 nm inclusive also provides a similar effect.

Modification of First Exemplary Embodiment

Next, a modification of projection apparatus 1 in the first exemplary embodiment of the present disclosure will be described with reference to FIGS. 9, 10, and 11. In this modification, only differences from the first exemplary embodiment will be described.

Figure 9:
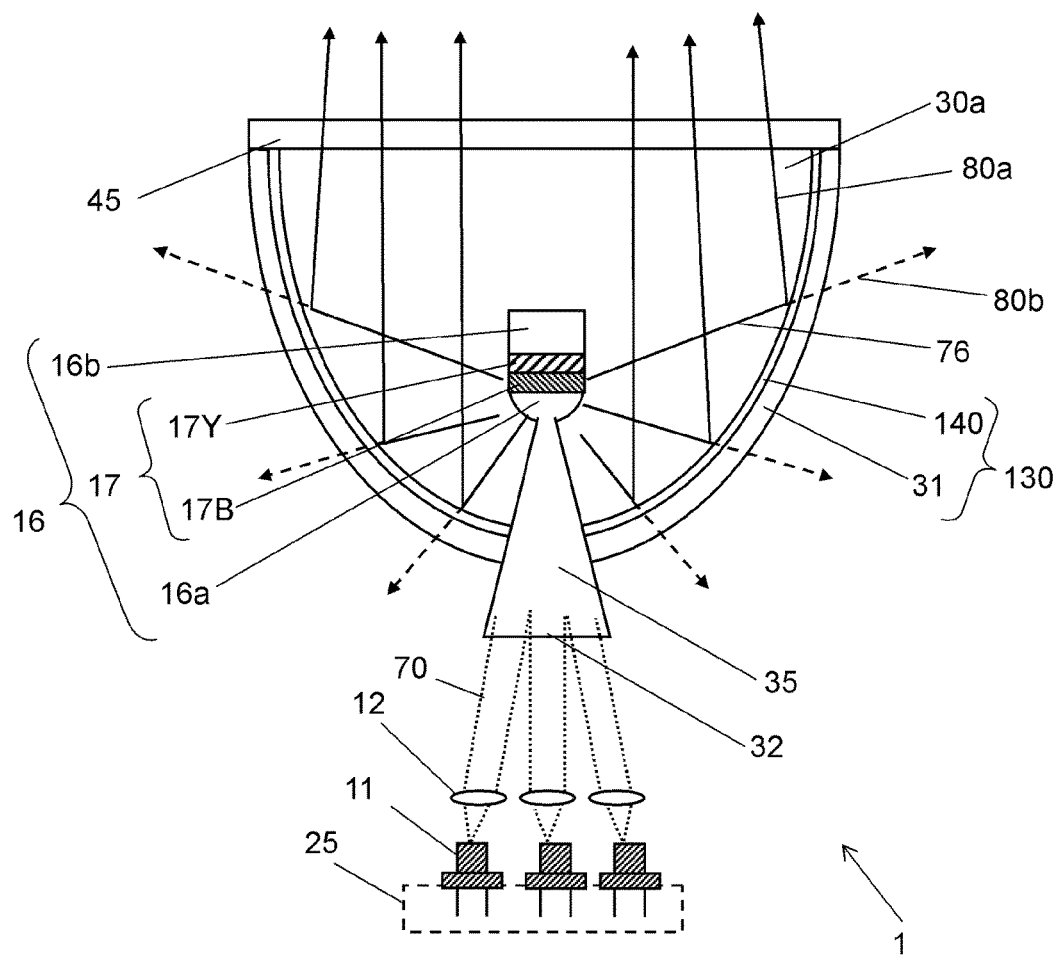
FIG. 9 is a schematic diagram of a projection apparatus in a modification of the first exemplary embodiment of the present disclosure.
Figure 10:
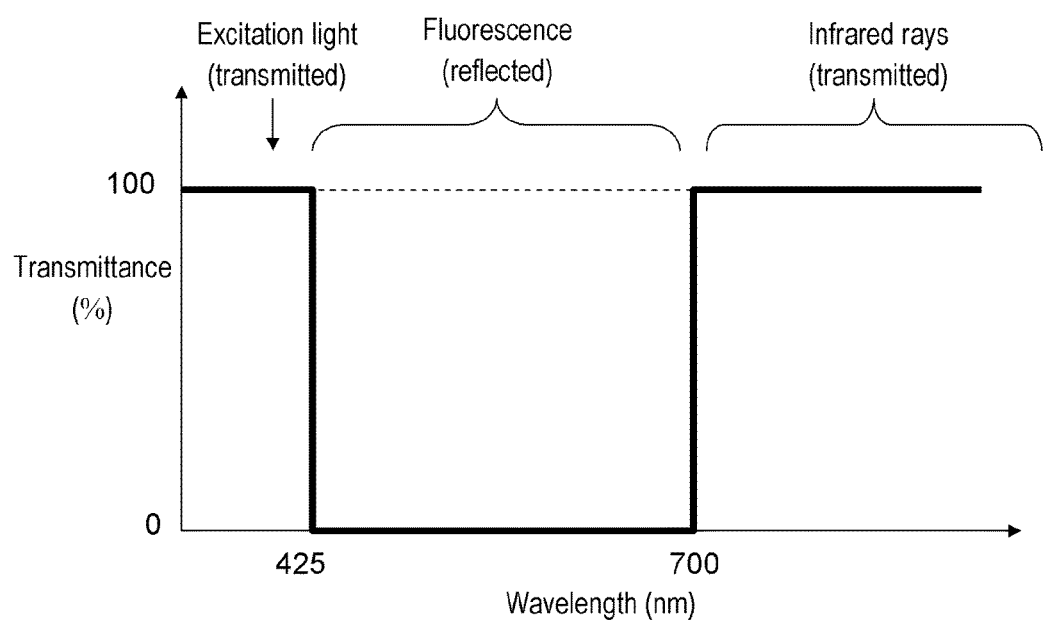
FIG. 10 is a graph showing a preferable transmission spectrum of an optical filter used in the projection apparatus in the modification of the first exemplary embodiment of the present disclosure.

A schematic diagram of a projection apparatus in the modification of the first exemplary embodiment of the present disclosure is shown in FIG. 9. In this modification, reflector 130 is used in place of reflector 30 in the first exemplary embodiment. Reflector 130 is formed with optical filter 140 on an inner surface of concave member 31 in a concave shape made of a transparent material such as glass, for example. Optical filter 140 has a concave shape, and wavelength converter 16 is disposed inside the concave shape. Optical filter 140 is preferably formed by a dielectric multi-layer film, for example, having characteristics of transmitting light of wavelengths of 420 nm or less and light of wavelengths of 700 nm or more, for example, as shown in FIG. 10. Preferably, transparent cover 45 made of a transparent material such as glass, for example, to protect wavelength converter 16 and optical filter 40 is disposed at opening 30a of reflector 130.

On the other hand, in this modification, wavelength converter 16 has phosphor layer 17 and reflecting member 16b stacked and fixed on support 16a in a hemispherical shape that is formed at a distal end portion of light-guiding member 35. Specifically, fourth phosphor layer 17Y of phosphor layer 17 is a phosphor layer containing a phosphor that emits yellow light such as an Eu-activated (Ba, Sr)$Si_2O_2N_2$ phosphor or a Ce-activated $Y_3(Al, Ga)_5O_{12}$ phosphor, for example. Third phosphor layer 17B is a phosphor layer containing a phosphor that emits blue light such as an Eu-activated $(Ba, Sr)_3MgSi_2O_8$ phosphor or an Eu-activated $BaMgAl_{10}O_{17}$ phosphor, for example. Reflecting member 16b is an aluminum alloy, for example, and is disposed at an outermost surface.

Next, an operation of projection apparatus 1 in this modification will be described. Emission light 70 emitted from light-emitting elements 11 propagates through light-guiding member 35 and support 16a, and is partly absorbed by fourth phosphor layer 17Y. Emission light 70 that has not been absorbed by fourth phosphor layer 17Y passes through fourth phosphor layer 17Y and enters third phosphor layer 17B. Light that has entered fourth phosphor layer 17Y and third phosphor layer 17B is converted into yellow light and blue light, and emitted as wavelength-converted light 76 of white light from wavelength converter 16. At this time, a spectrum of wavelength-converted light 76 constitutes laser light of a wavelength of about 405 nm and fluorescence having peaks at a wavelength of about 460 nm and at a wavelength of about 570 nm, white light are comprised of the laser light and the fluorescence shown in FIG. 3. Wavelength-converted light 76 emitted from wavelength converter 16 travels toward optical filter 140 on concave member 31. Light of wavelengths of 420 nm or less of wavelength-converted light 76, that is, laser light component 80c of a wavelength of about 405 nm passes through optical filter 140, and light converted by wavelength converter 16, that is, light of wavelengths of between 430 nm and 660 nm inclusive becomes reflected light 80a reflected off optical filter 140, and radiates in an upward direction in FIG. 9.

Figure 11:
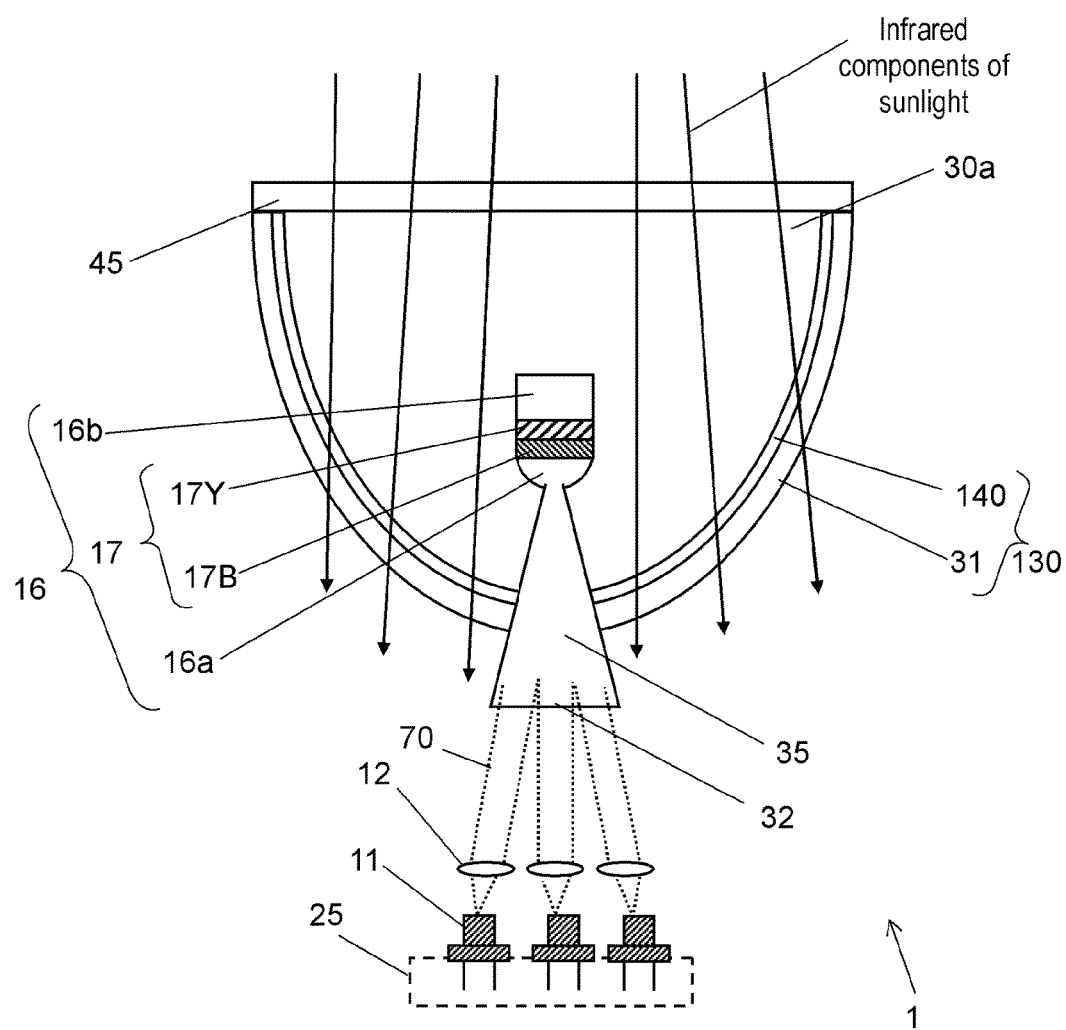
FIG. 11 is a schematic diagram illustrating an effect of the projection apparatus in the modification of the first exemplary embodiment of the present disclosure.

On the other hand, when projection apparatus 1 like this is installed outdoors, and sunlight enters from outside, infrared rays pass through optical filter 140 as shown in FIG. 11, and thus can be prevented from being concentrated onto wavelength converter 16, and wavelength converter 16 can be prevented from generating heat. Further, phosphor layer 17 can be prevented from being directly irradiated with infrared rays from outside since reflecting member 16b is disposed on phosphor layer 17.

As described above, in this modification, projection apparatus 1 can be easily configured since optical filter 140 constitutes a part of reflector 130.

Although as optical filter 140 according to the above-described modification of the first exemplary embodiment, an example of having characteristics of transmitting light of wavelengths of 420 nm or less and light of wavelengths of 700 nm or more has been described, optical filter 140 may be configured to absorb light of wavelengths of 420 nm or less and light of wavelengths of 700 nm or more, and to reflect light of wavelengths of between 430 nm and 660 nm inclusive. Alternatively, optical filter 140 may have characteristics of transmitting light of wavelengths of 420 nm or less and light of wavelengths of 700 nm or more, and concave member 31 may absorb light of wavelengths of 420 nm or less and light of wavelengths of 700 nm or more. The above configurations can provide similar effects, and also can prevent infrared light and laser light from radiating from a back surface of concave member 31 of the projection apparatus.

Second Exemplary Embodiment

Next, with reference to FIGS. 12A to 15, a projection apparatus and a projector according to a second exemplary embodiment of the present disclosure will be described.

Figure 12A:
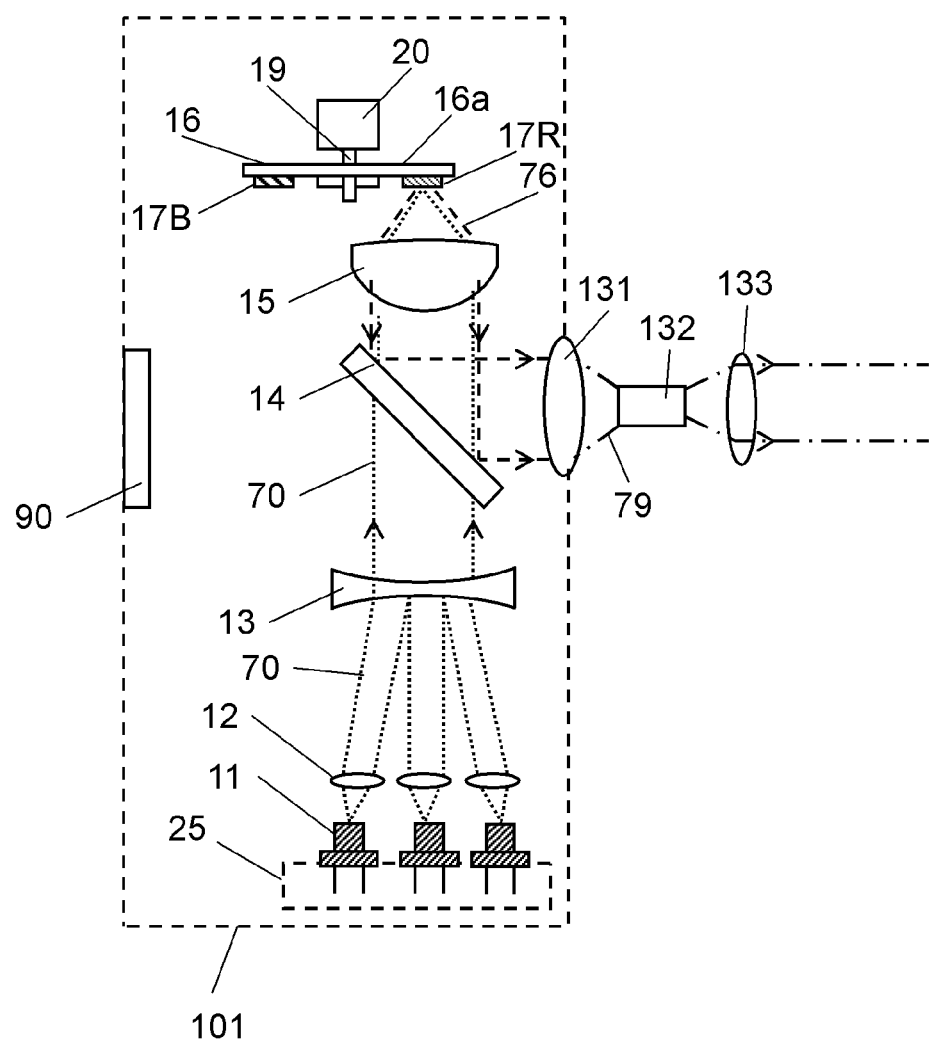
FIG. 12A is a schematic diagram of a projection apparatus in a second exemplary embodiment of the present disclosure.

FIG. 12A is a schematic diagram of a configuration of a projection apparatus in the second exemplary embodiment of the present disclosure. Common components with those in the first exemplary embodiment are denoted by the same reference numerals and will not be described.

Figure 12B:
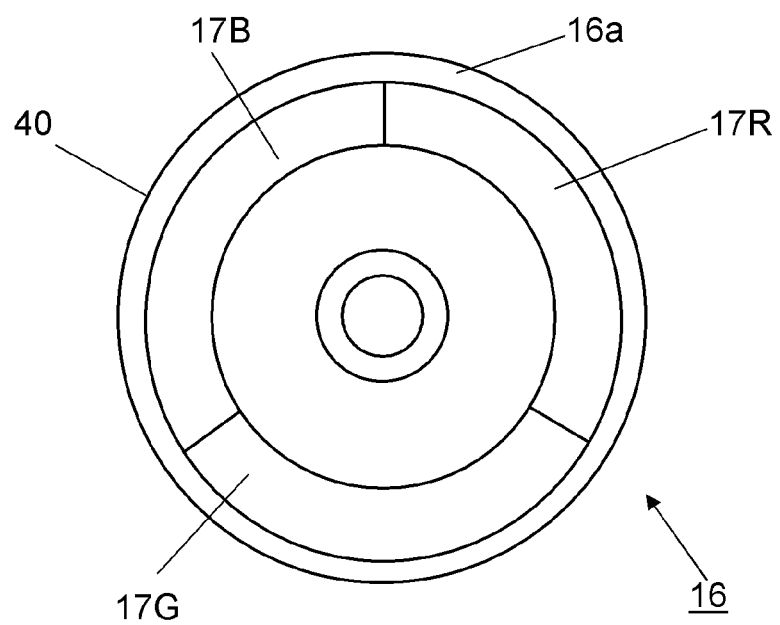
FIG. 12B is a schematic diagram of wavelength converter 16 of the projection apparatus in the second exemplary embodiment of the present disclosure.

Projection apparatus 101 shown in FIGS. 12A and 12B emits light of only the so-called red light with a main emission wavelength in a range from 590 nm to 660 nm inclusive, light of only the so-called green light with a main emission wavelength in a range from 500 nm inclusive to less than 590 nm, and light of only the so-called blue light with a main emission wavelength in a range from 430 nm inclusive to less than 500 nm. Light of these three colors is emitted as temporally-continuous wavelength-converted light 76. Wavelength-converted light 76 is light having a period of about 8.3 ms (120 Hz), for example. Three primary colors are emitted in the order of blue, green, and red, for example.

In a configuration of projection apparatus 101, for example, three light-emitting elements 11, semiconductor lasers with an optical output of 2 watts and a center wavelength of emission wavelengths in a range from 380 nm to 420 nm inclusive, for example, are disposed on heatsink 25. Emission light 70 emitted from light-emitting elements 11 is collected by collimating lenses 12 onto concave lens 13 to become straight light. The straight light passes through optical filter 14, and is concentrated by condenser lens 15 into a predetermined position on wavelength converter 16. Here, optical filter 14 is set so as to transmit light of wavelengths of between 380 nm and 420 nm inclusive, and reflect light of wavelengths of between 430 nm and 660 nm inclusive. A direction from optical filter 14 to wavelength converter 16 and a direction from optical filter 14 to long-wavelength absorber 90 form an angle of 90 degrees. Here, 90 degrees mean about 90 degrees, that is, contain errors in manufacture.

As shown in FIG. 12B, wavelength converter 16 has a configuration in which first phosphor layer 17R, second phosphor layer 17G, and third phosphor layer 17B are formed in three divisions in the same plane on a surface of a metal plate in a disc shape. First phosphor layer 17R contains a phosphor of Eu-activated (Sr, Ca)AlSiN, for example. Second phosphor layer 17G contains a phosphor of Ce-activated $Y_3(Al, Ga)_5O_{12}$, for example. Third phosphor layer 17B contains a phosphor of Eu-activated $Sr_3MgSi_2O_8$, for example. Wavelength converter 16 in FIG. 12B is a schematic diagram of wavelength converter 16 in FIG. 12A viewed from the light-emitting elements 11 side.

Wavelength converter 16 is configured with first phosphor layer 17R, second phosphor layer 17G, and third phosphor layer 17B formed on a metal plate (support 16a) of an aluminum alloy, for example. First phosphor layer 17R, second phosphor layer 17G, and third phosphor layer 17B are made by mixing the above-described phosphors into a binder (not shown) such as dimethyl silicone, for example. Wavelength converter 16 of this configuration is rotated by rotation mechanism 20 and rotation shaft 19 at a predetermined number of revolutions. By rotating, wavelength converter 16 can prevent emission light 70 from continuing to be emitted to a particular position on first phosphor layer 17R, second phosphor layer 17G, or third phosphor layer 17B. Further, wavelength converter 16 can be set so that an emission spectrum of wavelength-converted light 76 converted by wavelength converter 16 changes with time. Specifically, by the phosphor contained in first phosphor layer 17R, emission light 70 concentrated onto wavelength converter 16 is converted into wavelength-converted light 76 with a main wavelength of between 590 nm and 660 nm inclusive. By the phosphor contained in second phosphor layer 17G, emission light 70 concentrated onto wavelength converter 16 is converted into wavelength-converted light 76 with a main wavelength of 500 nm or more and less than 590 nm. By the phosphor contained in third phosphor layer 17B, emission light 70 concentrated onto wavelength converter 16 is converted into wavelength-converted light 76 with a main wavelength of 430 nm or more and less than 500 nm. A center wavelength of emission light 70 is between 380 nm and 420 nm inclusive. Wavelength-converted light 76 is again turned into wavelength-converted light of straight light by condenser lens 15 and reflected by optical filter 14, passes through condenser lens 131, light-guiding element 132, and lens 133, and is emitted from projection apparatus 101 as emission light 79. Long-wavelength absorber 90 is provided opposite to condenser lens 131 when viewed from optical filter 14.

Figure 13:
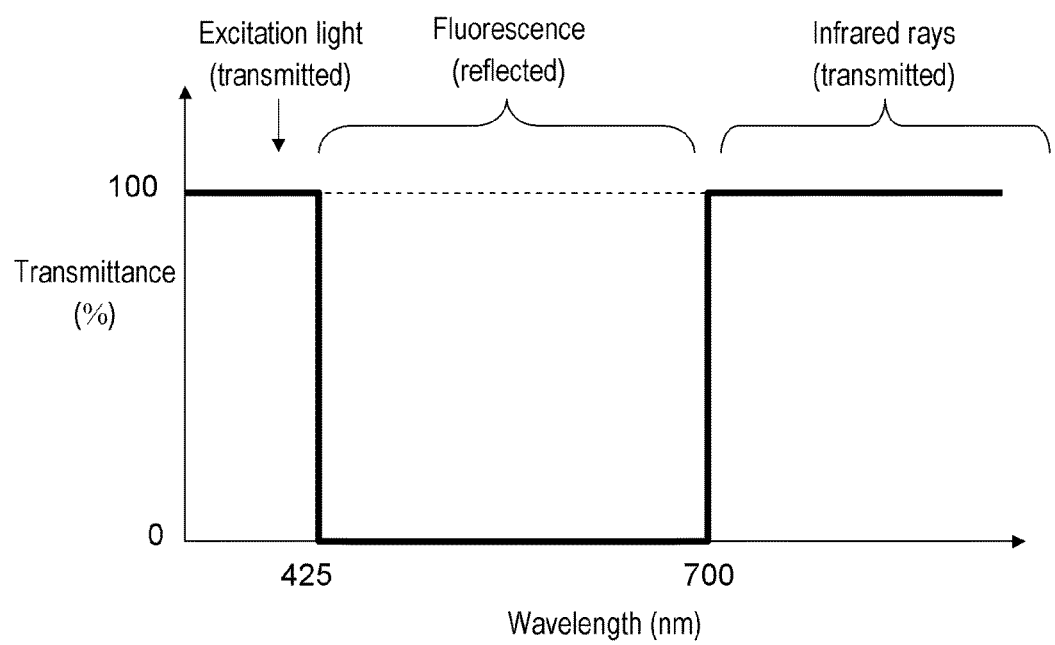
FIG. 13 is a graph showing a preferable transmission spectrum of an optical filter used in the projection apparatus in the second exemplary embodiment of the present disclosure.

In the above configuration, transmittance characteristics of optical filter 14 preferably have characteristics of transmitting light of wavelengths of 420 nm or less and light of wavelengths of 700 nm or more, and reflecting light of wavelengths of between 430 nm and 660 nm inclusive, for example, as shown in FIG. 13.

Figure 14:
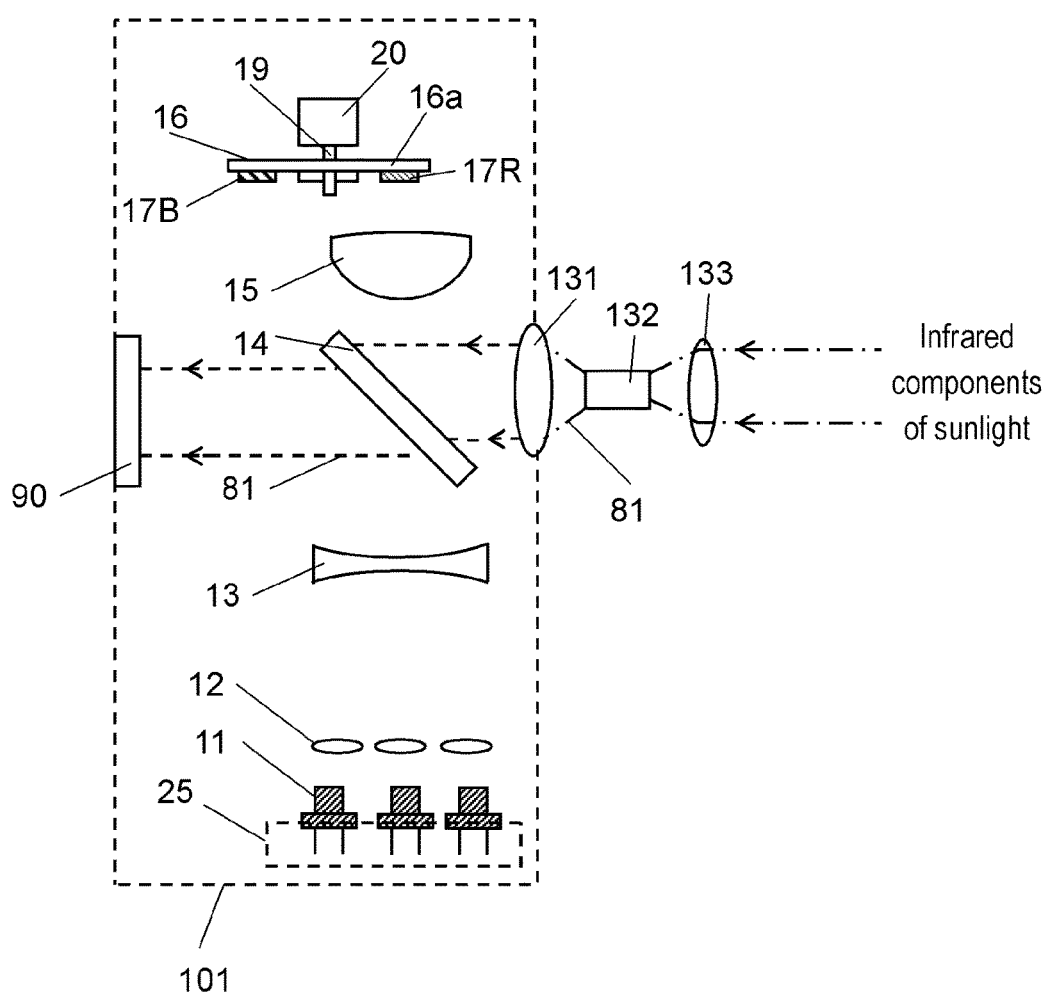
FIG. 14 is a schematic diagram illustrating an operation of the projection apparatus of the present disclosure.

Even when sunlight or the like enters into projection apparatus 101 from outside, as shown in FIG. 14, this configuration allows most of infrared rays 81 to pass through optical filter 14 to be absorbed by long-wavelength absorber 90. Thus, sunlight or the like can be prevented from entering and being concentrated onto wavelength converter 16, and wavelength converter 16 can be prevented from deterioration.

Figure 15:
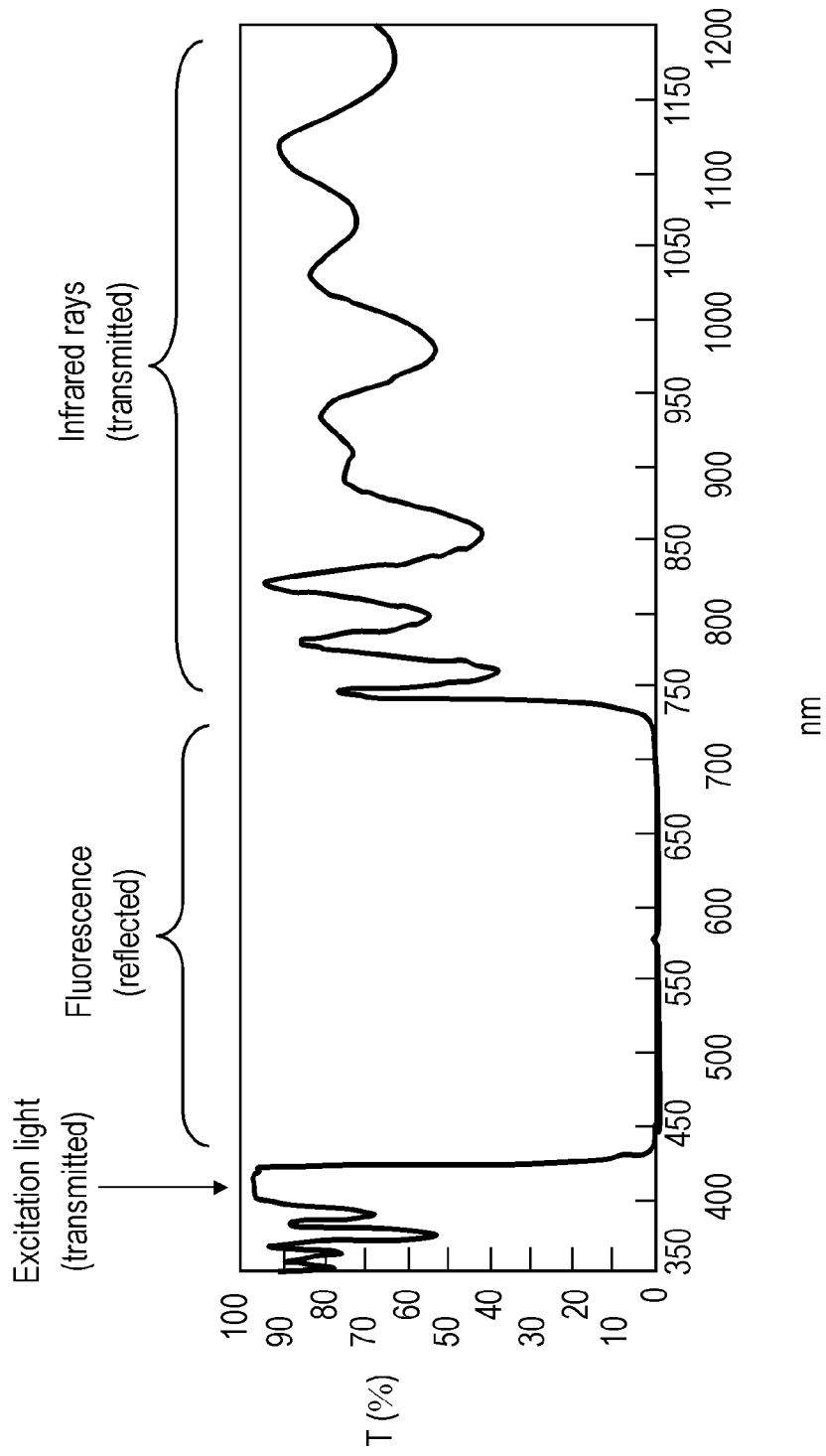
FIG. 15 is a graph showing a transmission spectrum of a specific example of the optical filter used in the projection apparatus of the present disclosure.
Figure 16:
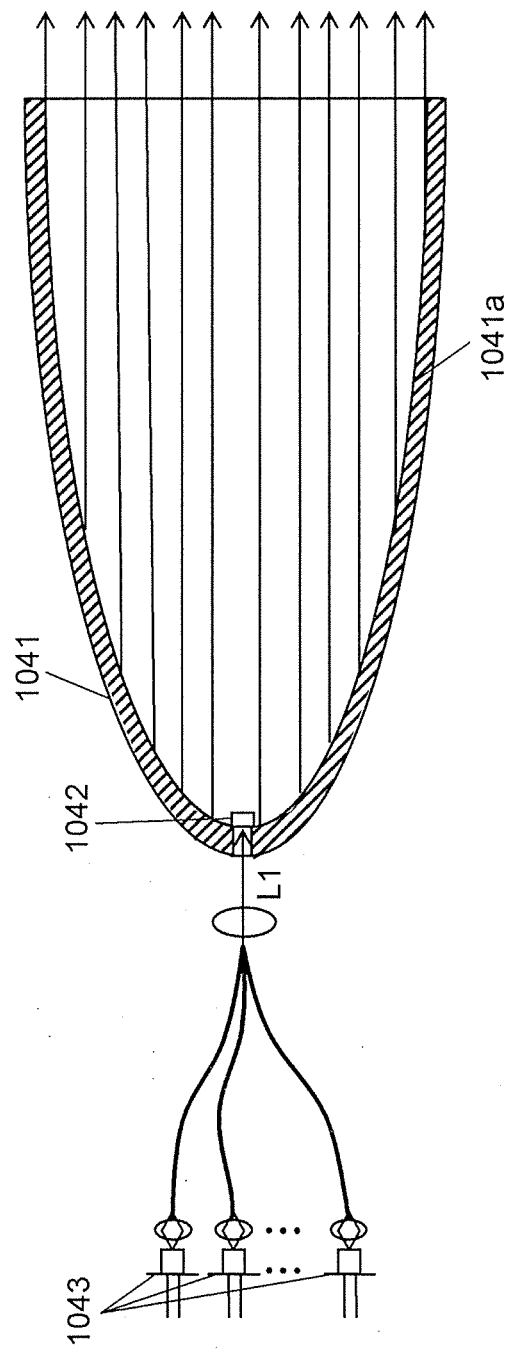
FIG. 16 is a schematic diagram of a conventional projection apparatus.

A specific example of optical filter 14 will be described below. FIG. 13 shows ideal spectrum characteristics of optical filter 14. Optical filter 14 is formed by a multi-layer film of $SiO_2$ and $TiO_2$, for example. As shown in FIG. 15 illustrating a reflection spectrum of optical filter 14, optical filter 14 in this exemplary embodiment transmits light of wavelengths of 420 nm or less and light of wavelengths of 730 nm or more, and reflects light of wavelengths of between 430 nm and 660 nm inclusive.

Measurements of a spectrum of radiation light emitted from projection apparatus 101 under sunlight, using optical filter 40 having the transmission spectrum characteristics shown in FIG. 15 provided results similar to those in the spectrum comparison described with reference to FIG. 7 in the first exemplary embodiment. That is, there were almost no differences in color temperatures and average color rendering indices between the case of using optical filter 40 and the case of not using optical filter 40. As is clear from these explanations, using projection apparatus 101 of the present disclosure allows the deterioration caused by infrared rays from sunlight to be effectively restrained without much changing emission light from light-emitting elements 11.

As kinds of phosphor for blue light, green light, yellow light, and red light used in the projection apparatuses described in the first and second exemplary embodiments, an Eu-activated $Sr_3MgSi_2O_8$ phosphor, an Eu-activated $BaMgAl_{10}O_{17}$ phosphor, a Ce-activated $Y_3(Al, Ga)_5O_{12}$ phosphor, an Eu-activated $(Ba, Sr)Si_2O_2N_2$ phosphor, Ce-activated $Y_3Al_5O_{12}$, Eu-activated (Sr, Ca)AlSiN, and others have been presented, which are not limitative. For example, other than the above-described phosphors, Eu-activated CaAlSiN, a Ce-activated $Y_3Al_5O_{12}$ phosphor, Eu-activated β-SiAlON, Eu-activated α-SiAlON, Eu-activated (Sr, Ca, Ba)$_3$MgSi$_2$O$_8$, Eu-activated (Sr, Ca)$_3$MgSi$_2$O$_8$, Eu-activated (Sr, Ba)$_3$MgSi$_2$O$_8$, Eu-activated (Sr, Ca, Ba)$_2$MgSi$_2$O$_7$, Eu-activated (Sr, Ca)$_2$MgSi$_2$O$_7$, Eu-activated (Sr, Ba)$_2$MgSi$_2$O$_7$, and the like, for example, may be optimized for use.

The projection apparatuses of the present disclosure usefully have an effect of being able to improve the durability of illumination apparatuses used outdoors such as lighting for vehicles.

What is claimed is:
1. A projection apparatus comprising:
   a light-emitting element configured to emit excitation light;
   a wavelength converter configured to receive the excitation light, convert the excitation light into light of a different wavelength, and emit the converted light as radiation light;

an optical filter configured to receive the radiation light, reflect an infrared ray and the excitation light, and transmit the radiation light, and a reflector having a concave shape;

wherein the wavelength converter is disposed inside the concave shape, and the optical filter is provided to cover an opening of the reflector.

2. The projection apparatus according to claim 1, wherein the optical filter transmits light of wavelengths of between 430 nm and 660 nm inclusive.

3. The projection apparatus according to claim 1, wherein the radiation light contains visible light.

4. A projection apparatus comprising:

a light-emitting element configured to emit excitation light;

a wavelength converter configured to receive the excitation light, convert the excitation light into light of a different wavelength, and emit the converted light as radiation light; and an optical filter configured to receive the radiation light and transmit long-wavelength light of wavelengths longer than wavelengths of the radiation light, wherein the optical filter has a concave shape, and the wavelength converter is disposed inside the concave shape.

5. The projection apparatus according to claim 4, wherein the optical filter reflects light of wavelengths of between 430 nm and 660 nm inclusive.

6. A projection apparatus comprising:

a light-emitting element configured to emit excitation light;

a wavelength converter configured to receive the excitation light, convert the excitation light into light of a different wavelength, and emit the converted light as radiation light;

an optical filter configured to receive the radiation light and transmit long-wavelength light of wavelengths longer than wavelengths of the radiation light; and a long-wavelength absorber configured to receive the long-wavelength light, wherein the long-wavelength light is absorbed in the long-wavelength absorber.

7. The projection apparatus according to claim 6, wherein a direction from the optical filter to the wavelength converter and a direction from the optical filter to the long-wavelength absorber form an angle of 90 degrees.

8. The projection apparatus according to claim 1, wherein the long-wavelength light is light in a wavelength band of infrared rays.

9. The projection apparatus according to claim 4, further comprising, a concave member having a concave shape; wherein the optical filter is formed on the inside the concave shape, and the concave member absorbs a light which transmits the optical filter.

10. The projection apparatus according to claim 9, wherein the concave member absorbs the light of wavelengths of 420 nm or less and the light of 700 nm or more, inclusive.

* * * * *